United States Patent [19]

Costantino et al.

[11] Patent Number: 5,036,528
[45] Date of Patent: Jul. 30, 1991

[54] SELF-CALIBRATING CLOCK SYNCHRONIZATION SYSTEM

[75] Inventors: Cirillo L. Costantino, Castro Valley; David P. Chengson, Mountain View; Duc N. Le, Santa Clara; Lordson L. Yue, Sunnyvale; Aurangzeb K. Khan, Cupertino, all of Calif.

[73] Assignee: Tandem Computers Incorporated, Cupertino, Calif.

[21] Appl. No.: 471,915

[22] Filed: Jan. 29, 1990

[51] Int. Cl.$^5$ .................................... H03D 3/24
[52] U.S. Cl. .................................... 375/119; 331/18; 328/133; 328/155
[58] Field of Search ............... 375/118–120, 375/81; 331/11, 12, 18; 328/63, 155, 133; 370/100.1

[56] References Cited

U.S. PATENT DOCUMENTS

| | | | |
|---|---|---|---|
| 4,451,917 | 5/1984 | DeCoursey | 370/108 |
| 4,488,297 | 11/1984 | Vaid | 371/1 |
| 4,511,846 | 4/1985 | Nagy et al. | 328/164 |
| 4,569,065 | 2/1986 | Cukier | 375/120 |
| 4,584,695 | 4/1986 | Wong et al. | 375/81 |
| 4,617,679 | 10/1986 | Brooks | 375/119 |
| 4,677,648 | 6/1987 | Zurfluh | 375/120 |
| 4,696,051 | 9/1987 | Breeden | 455/33 |
| 4,696,052 | 9/1987 | Breeden | 455/51 |
| 4,756,010 | 7/1988 | Nelson et al. | 375/94 |
| 4,805,195 | 2/1989 | Keegan | 375/106 |
| 4,807,259 | 2/1989 | Yamanaka et al. | 375/109 |

Primary Examiner—Douglas W. Olms
Assistant Examiner—Tesfaldet Bocure
Attorney, Agent, or Firm—Townsend and Townsend

[57] ABSTRACT

The present invention is directed to a self-calibrating clock synchronization system that receives a periodic, digital clock signal as a reference and generates therefrom a system clock signal that dynamically tracks and is synchronized to the reference clock. The invention utilizes state machine controlled selection circuitry that comprises a plurality of predetermined delays tapped to produce a number of phase-related clock signals, and multiplexing circuitry, for selecting one of the plurality of clock signals as the system clock. A comparator compares the selected clock signal and the reference clock to determine which leads or lags the other. In response to the comparison, selection, from the plurality of clock signals, of a system clock that most clearly matches the reference signal is made.

13 Claims, 5 Drawing Sheets

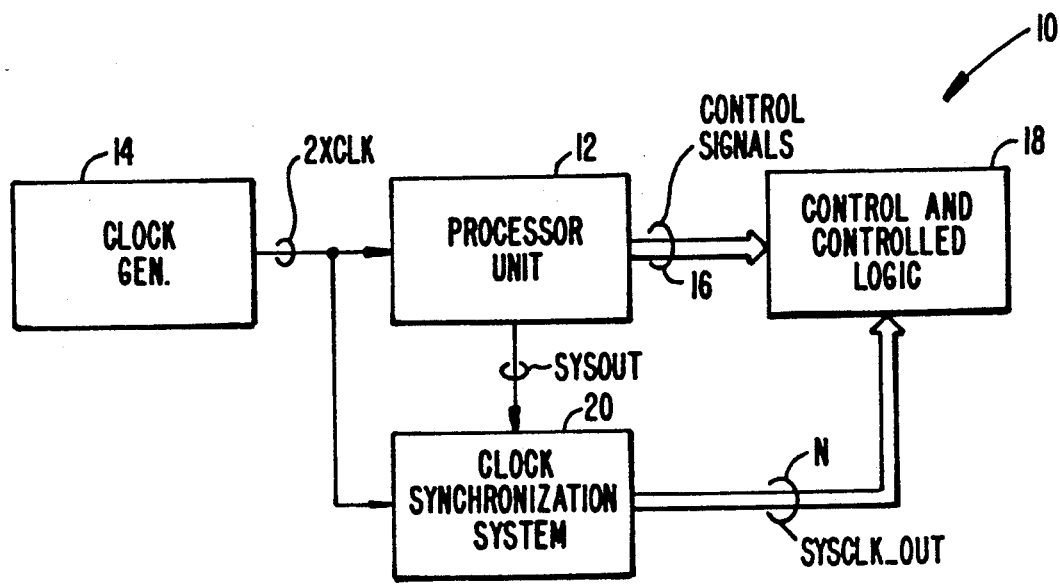
FIG._1.
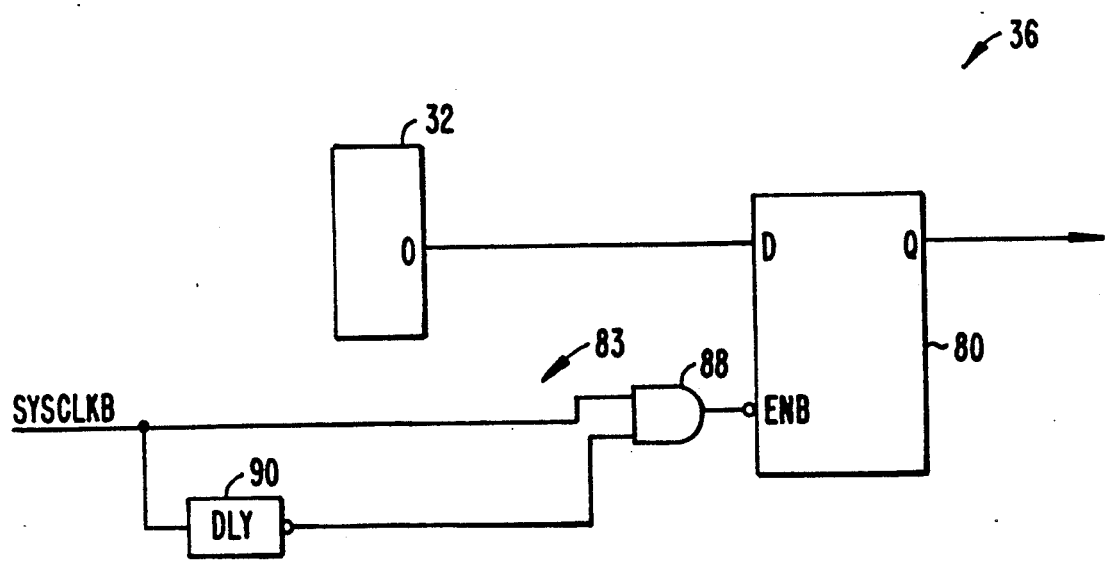
FIG._4.

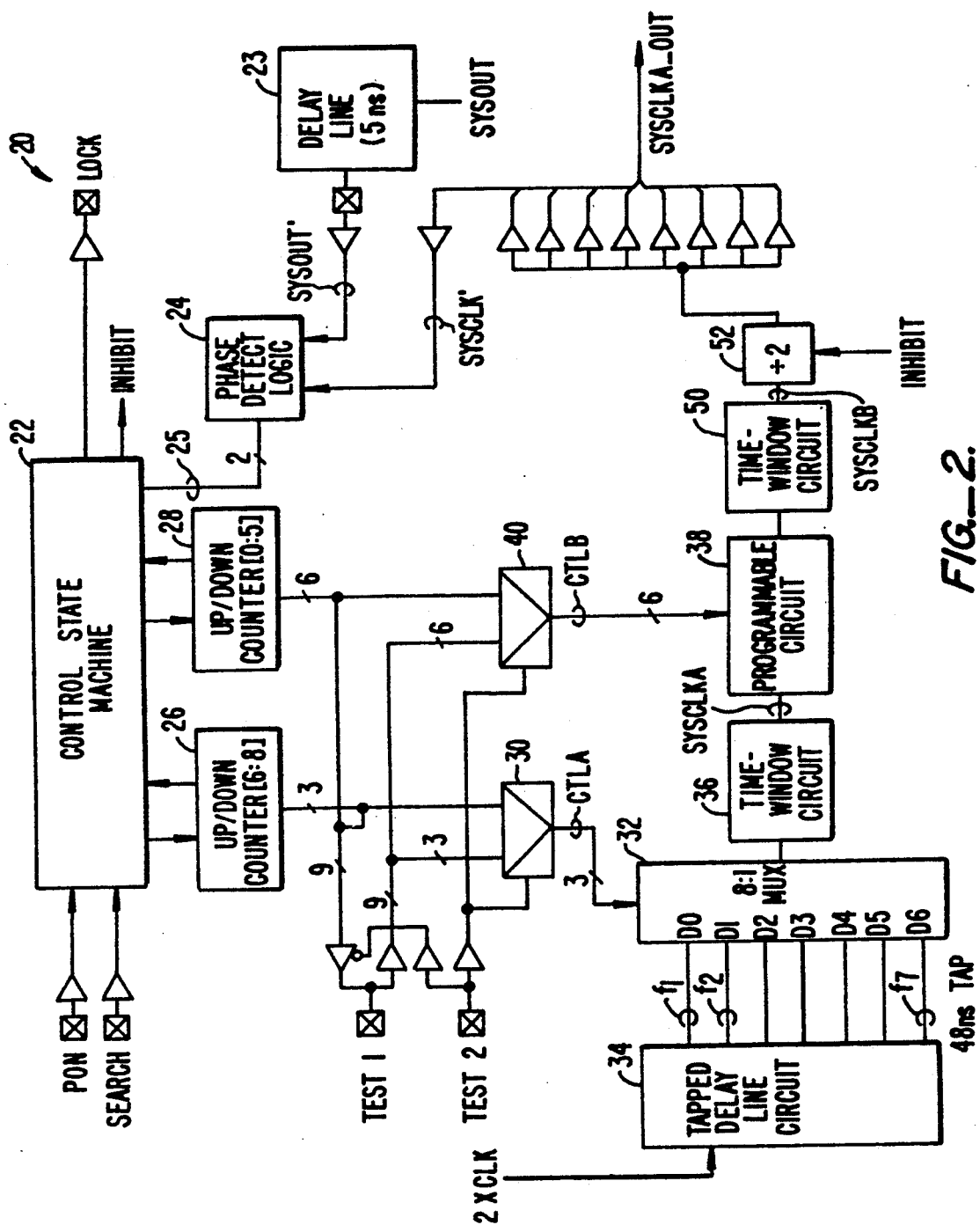
FIG._2.

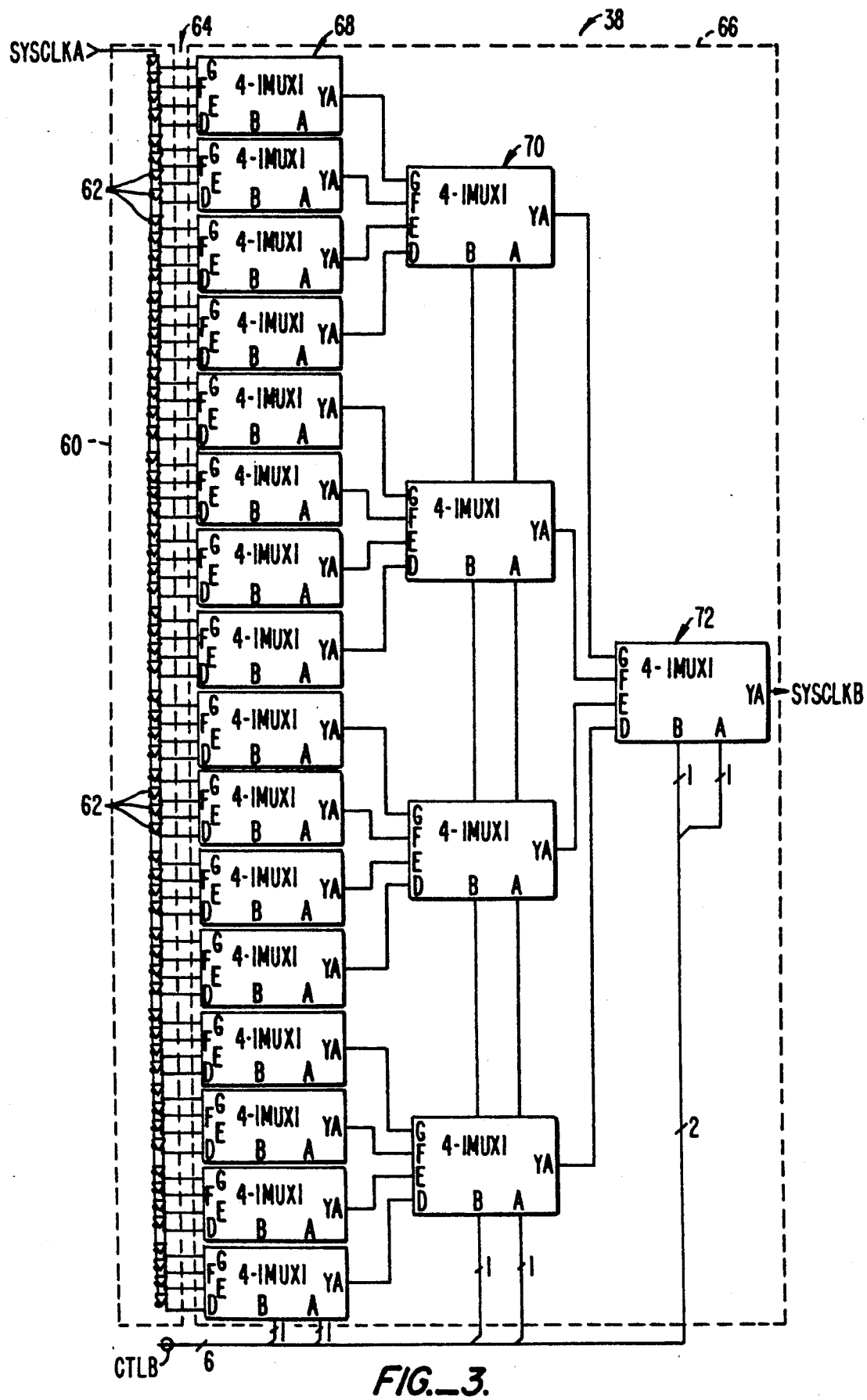
FIG._3.

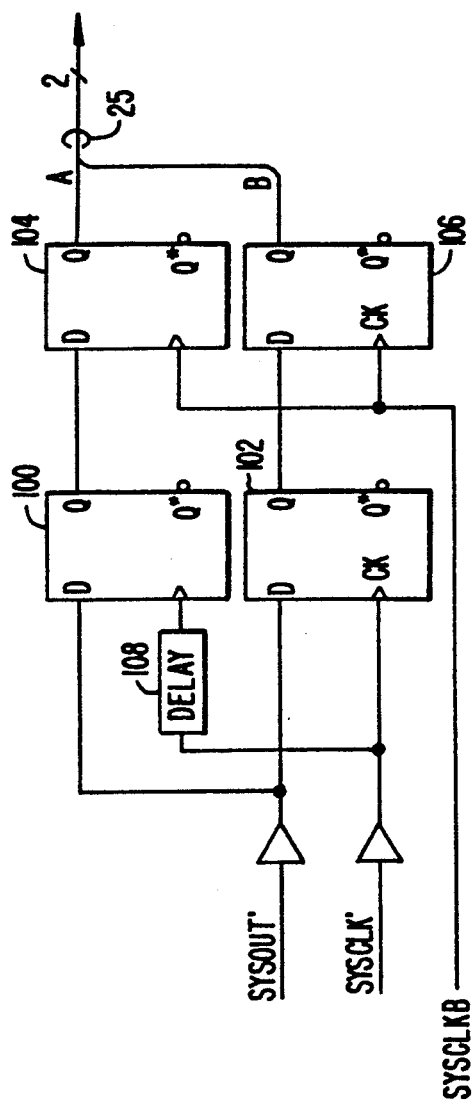
FIG._5.
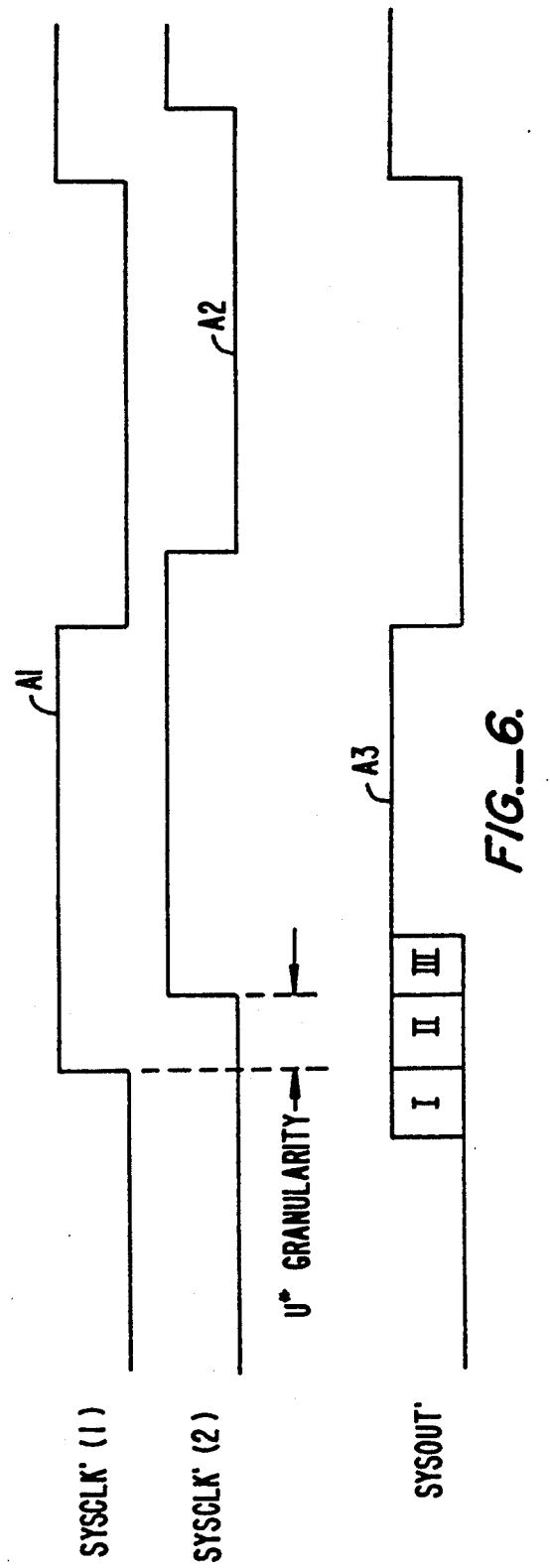
FIG._6.

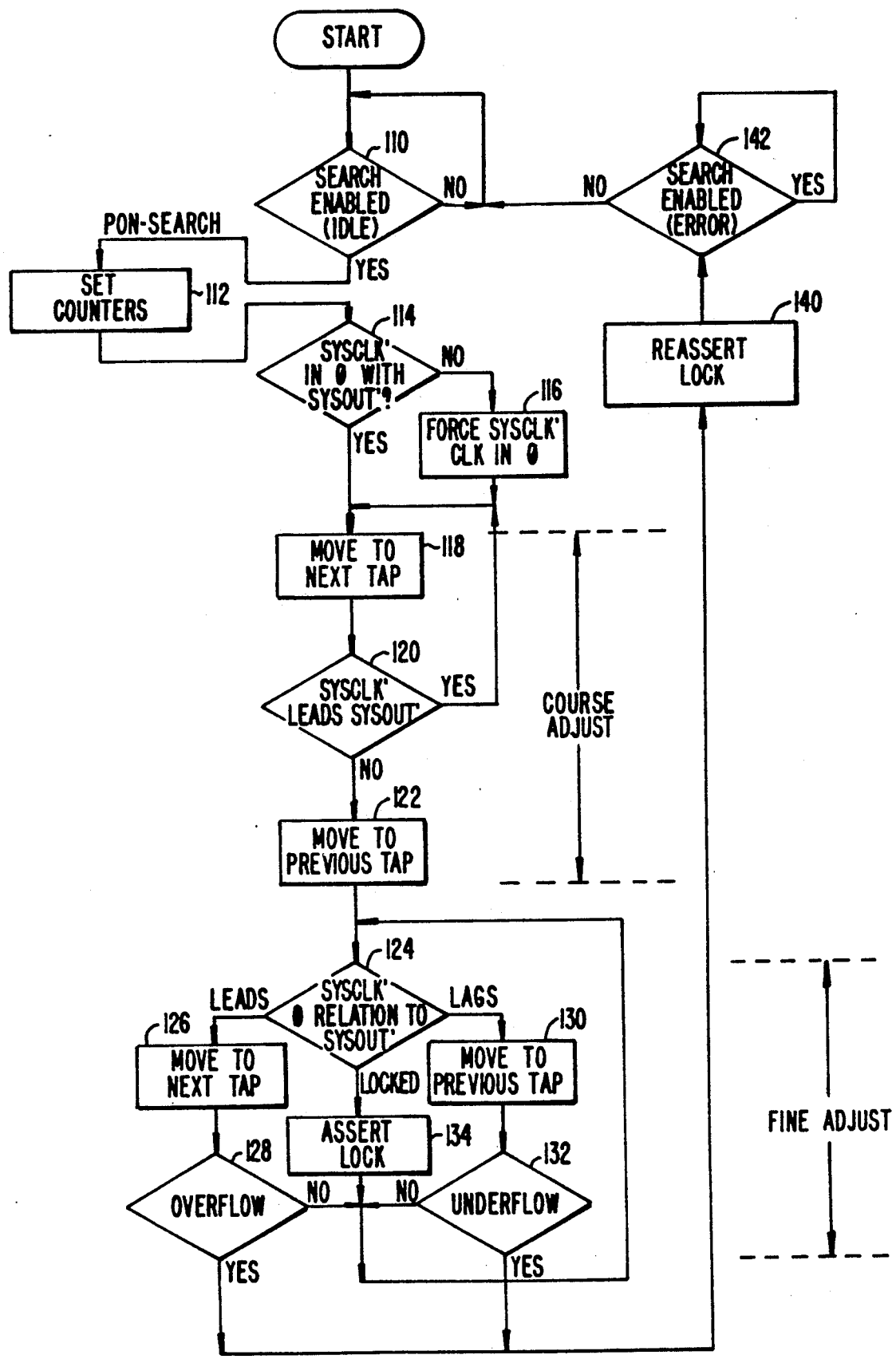
FIG._7.

SELF-CALIBRATING CLOCK SYNCHRONIZATION SYSTEM

BACKGROUND OF THE INVENTION

The present invention is directed generally to digital systems, and more particularly to a clock synchronization system for developing a clock signal synchronized to a reference signal.

Much, if not all, of today's computing systems are synchronous machines; that is, machines in which decisions are made, events happen, and activity occurs in response to transitions of a periodic clock signal. It is often necessary, therefore, that a periodic clock signal be variously distributed to a large number of clocked devices (e.g., counters, latches, flip-flops, etc.) located throughout the system. And, as the size of the computing system increases, distribution of a single clock signal to the system elements can present problems. These problems are exacerbated when the operating frequencies of the system increase.

One approach has been use a number of driver elements, all of which receive the clock signal, to thereby develop a plurality of clock signals that are then distributed throughout the system as the system clock. This approach works well at lower system speeds. However, it has serious limitations when used in high performance systems. As the operating frequency of the system approaches 20-40 MHz and above, clock skew becomes a significant consideration. Past distribution schemes, such as that described above, can limit the speed with which the digital system will operate. Destination loading, lead lengths, and parasitic factors will introduce propagation delay, edge degradation, and the like, ultimately resulting in the distributed signal being delayed or "skewed" relative to the original when it reaches its ultimate destination. This skew must be taken into effect during design and operation, limiting system speed.

Certain clock distribution schemes have been realized with commercially available parts, either in discrete or integrated form, but with limited success. Those clock distribution schemes implemented in discrete elements (e.g., individual transistors and resistors) will usually impart unacceptable (and unequal) propagation delays and output skews. The clock distribution schemes using elements in integrated form will, of course, use circuit elements often manufactured under different processing conditions, and therefore most likely will exhibit different operating characteristics (i.e., minimum and maximum delay differences, etc.). Further, when the distribution circuitry is implemented in circuit parts different from that generating and using the clock signals, the variances due to temperature or voltage fluctuations may differ from part to part.

Further still, to form the necessary number of clock distribution buffers/drivers on a single integrated circuit chip can lead to significant noise problems (e.g., delta I or ground bounce) caused principally by the parasitic inductive path to ground. This type of problem is exacerbated in larger systems requiring a larger clock distribution network.

Other, more exotic clock distribution schemes have also been proposed and implemented, such as those employing GaAs laser diodes with fiber optic distribution. However, the cost of implementing these non-standard clock circuits can be prohibitive, and often entail considerable technical risk.

The end result of presently available clock distribution is that the various of the plurality of clock signals distributed to perform the synchronous operations in a computing system will not be synchronous to one another; that is, the various unwanted electrical characteristics encountered in known distribution schemes, such as those referred to above, will limit the operating speed of today's computing systems. The various clock signals that are distributed throughout the system must have transitions (i.e., LOW to HIGH or HIGH to LOW) that are within an acceptable range of one another. More time must be given to ensure that the clocked circuit elements of the system change at the same time, as dictated by the received clock signal. If the clock signal received by a particular clocked element leads or lags that received by another clocked element, race conditions and unpredictable results can occur.

Accordingly, it can be seen that a clock synchronization scheme that can produce a plurality of clock signals synchronized to one another and to a reference (system) clock, and capable of maintaining that synchronization over time, is needed.

SUMMARY OF THE INVENTION

Presented here is a clock synchronization system that produces a clock signal for distribution throughout the digital system that tracks a reference signal irrespective of temperature, voltage, and process variations.

In its broadest form, the invention comprises a tapped delay line circuit that receives a free-running clock, producing therefrom a plurality of replicas of the free-running clock, differing only from one another by a predetermined phase relationship. A multiplexer circuit, under control of a state machine, selects one of the plurality of phase-related clock signals, and compares it to a reference (i.e., the clock signal to be tracked). The comparison produces an indication of whether the selected phase-related clock signal leads, lags, or is within an acceptable synchronization range of, the reference. The indication is submitted to the state machine, which responses by causing selection of another of the phase-related clock signals if the two compared signals are not indicated as being within the acceptable synchronization range. The comparison and selection continues until a selected phase-related clock signal is found that is within the predetermined synchronization range of the reference clock signal. The selected phase-related clock is then used as the distributed system clock.

In the preferred embodiment of the present invention, there are two separate tapped delay lines, each feeding multiplex circuits that operate to select one of the number of phase-related clock signals under control by the state machine through an up/down counter configuration. The first tapped delay line receives the free-running clock, producing a first plurality of phase-related clock signals differing in phase from one another by a first, coarse amount. A first multiplex circuit selects one of the phase-related clock signals as first coarse clock, which is then, in turn, applied to a second tapped delay line that produces therefrom clock signals that differ in phase from one another by a lesser amount. A second multiplex circuit selects therefrom the signal that will be compared to the reference signal, and will be the distributed system clock.

Additional features of the present invention include time window circuits that mask production of digital "slivers" or "glitches" can often be produced by the multiplexer circuits during transitions from selection of one clock to another.

The selected clock signal can then be replicated via a number of buffer driver circuits, preferably formed on the same integrated circuit wafer as the invention, to produce a plurality of system clock signals for distribution throughout the digital system.

A number of advantages are achieved by the present invention. First, the clock synchronization system produces a system clock that can dynamically track a reference clock over temperature and voltage variations.

Further, since the clock that will be distributed throughout the system is adjusted by comparing that clock with the reference, process variations in manufacturing various of the components, as well as variations due to temperature and voltage changes, minimally affect the synchronization operation of the invention. This is so since these variations occur prior to the point of synchronization: the circuit used to compare the distributed clock signal and the reference signal.

These and other advantages will become apparent to those skilled in the art upon a reading of the following detailed description of the invention, which should be taken in conjunction with the accompanying drawings.

BRIEF DESCRIPTION OF THE DRAWINGS

FIG. 1 is a representative digital system, in block diagram form, illustrating incorporation of the clock synchronization system of the present invention;

FIG. 2 is a schematic block diagram of the clock synchronization system of the present invention;

FIG. 3 is a schematic diagram of one of the tapped delay lines, and associated multiplexer circuit, used in connection with the clock synchronization system shown in FIG. 2;

FIG. 4 is a schematic diagram of the time window circuit used in the clock synchronization system of FIG. 2;

FIG. 5 is a schematic representation of the phase-detect logic used to compare the reference clock with the generated, synchronized clock in the clock synchronization circuit of FIG. 2;

FIG. 6 is a timing diagram, illustrating operation of the phase-detect logic illustrated in FIG. 5; and FIG. 7 is a flow chart diagram of the operation of the clock synchronization circuit of FIG. 2.

DETAILED DESCRIPTION OF THE INVENTION

Referring now to the Figures, and in particular FIG. 1, there is broadly illustrated a digital system, designated generally with the reference numeral 10, illustrating incorporation of the clock synchronization system of the present invention. As shown, the digital system 10 includes a processor unit 12 operable in response to a clock signal (2×CLK) provided by a clock generator 14. The processor unit 12 operates to generate various control signals that are communicated on a multi-signal line bus 16 to control and controlled logic 18. Generally, the control and controlled logic 18 will include various state elements (e.g. latches, flip-flops, counters, memories, etc.) that synchronously operate with the control signals and a distributed system clock. The processor unit 12 provides, as a reference system clock, the periodic clock signal (SYSOUT) that is developed from 2×CLK to generate various of the synchronous control signals communicated on the bus 16.

SYSOUT is coupled to a clock synchronization system 20, constructed in accordance with the teachings of the present invention, as more fully described below. The clock synchronization system 20 receives the 2×CLK signal to produce therefrom a number (N) of clock signals (SYSCLKOUT) that are synchronized replicas of the SYSOUT signal (i.e., each of the SYSCLKOUT signals are within an acceptable synchronization range of the SYSOUT signal). The N SYSCLKOUT signals so provided are communicated to and distributed throughout the control and controlled logic 18 for clocking functions and synchronous operation of the circuitry contained therein.

Preferably, the clock synchronization system 20 will be implemented in integrated circuit form. However, in the embodiment of the invention described herein, one element, tapped delay line 34 (FIG. 2), is a discrete element, a standard passive, distributed LC line with 8 ns delays between each tap. Such devices are manufactured by and commercially available from Rhombus Corporation, located at 15801 Chemical Lane, Huntington Beach, Calif. 92649, which identifies them with the Part No. DSP1056.

Referring now to FIG. 2, the clock synchronization system 20 is illustrated in greater detail. As shown, the clock synchronization system 20 includes a control state machine 22 that, in response to signaling from a phase-detect detect logic 24, controls a pair of up/down counters 26, 28 together forming a nine-bit counter. The up/down counter 26, a three-bit counter, generates a selection signal that is supplied to the control inputs, via a multiplexer 30, of an 8-to-1 multiplexer 32.

The multiplexer 32 receives, at its data inputs (D0-D6) the outputs of a tapped delay line circuit 34. The tapped delay line circuit 34 receives the 2×CLK from the clock generator 14 (FIG. 1), and provides therefrom seven phase-related signals, each a replica of 2×CLK but delayed in time by a multiple of 8 nanoseconds (ns). Thus, each of the clock signals, $f_1$-$f_7$, provided by the tapped delay line circuit 34 is delayed relative to an immediately earlier clock signal by 8 ns. For example, a first frequency ($f_1$) is 2×CLK, while a second signal ($f_2$) is 2×CLK delayed by eight nanoseconds, and so on, until the seventh signal ($f_7$), which is 2×CLK delayed by 48 ns.

The content of the up/down counter 26 effects selection of one of the signals $f_1$-$f_7$, via the multiplexer 32, for communication to a time window circuit 36. The time window circuit operates to inhibit digital slivers or glitches that can occur when the multiplexer 32 is commanded to switch selection from one to another of the phase-related frequencies $f_1$-$f_7$. The selected signal is communicated by the time window circuit 36 as SYSCLKA to a programmable delay circuit 38 that operates in response to control signals from the up/down counter 28, a six-bit counter, via a multiplexer 40, to produce a clock (SYSCLKB). This SYSCLKB clock signal is used throughout the clock synchronization system 20 as the system clock. Thus, for example, SYSCLKB is the clock used for synchronous operation of the state machine 22. As will be seen, the programmable delay circuit 38 is of the same basic configuration as that used to produce the SYSCLKA signal, i.e., a tapped delay line/multiplexer combination. The programmable delay circuit 38 operates to generate, and effect selection of one of, a number of phase-related clocks, developed from SYSCLKA.

The clock signal so generated and selected by the programmable delay circuit 38 is communicated, via a second time window circuit 50, to a divide-by-2 circuit 52 as SYSCLKB. The output of the divide-by-2 circuit 52 is applied to output drivers 54 which produce the N versions of SYSCLKOUT that are distributed as the system clock to the control and controlled logic 18 (FIG. 1).

As FIG. 2 illustrates, one of the SYSCLKOUT signals is coupled to an input of the phase-detect logic 24 as SYSCLK'. The other input of the phase-detect logic 24 receives, as SYSOUT', the SYSOUT signal from the processor unit 12 (FIG. 1), via a 5 ns delay line 23. The 5 ns delay imposed results in ensuring that the transitions of clocks signals (the N versions of SYSCLK-OUT) that are applied to the control and controlled logic 18 will occur after the control signals communicated on the bus 16 have settled down.

The two signals, SYSCLK' and SYSOUT' are compared to one another by phase-detect logic 24, which determines if SYSOUT' (1) leads, (2) lags, or (3) is within an acceptable, predetermined range of SYSCLK'. The outcome of the comparison provides signaling on signal lines 25 to the control state machine 22 indicative of the phase relationship of SYSOUT' and SYSCLK', as indicated above. The control state machine responds to the signalling on signal lines 25 to generate the CTLA and CTLB control signals, if need be, to manipulate (i.e., count up or count down) of the up/down counters 26, 28 until SYSCLK' (i.e., SYSCLKB) is synchronized (i.e., matches) the 5 ns delayed version of SYSOUT.

FIG. 3 illustrates the structure of the programmable delay circuit 38. As can be seen, the programmable delay circuit 38 comprises a digital delay line 60 and a multiplexer circuit 66. The digital delay line 60 includes a series string of buffers 62 implemented in half-swing, differential ECL logic to minimize delay variations in rising and falling edges of input transitions. Each non-inverting buffer 62 is structured to provide a propagation delay of 0.4 ns. As indicated above, the programmable digital delay line 60 receives the SYSCLKA clock signal from the time-window circuit 36 (FIG. 2), producing therefrom 64 phase-delayed versions of SYSCLKA. Each phase-delayed version of SYSCLKA appears at an output of corresponding ones of the non-inverting buffers 62, which in turn provide one of the taps 64 the corresponding phase-delayed version of SYSCLKA.

The versions of SYSCLKA that appear at the taps 64 are applied to the multiplexer circuit 66, comprising three banks (68, 70 and 72) of multiplexers. As FIG. 3 illustrates, the first bank 68 of multiplexers comprises 16 four-input multiplexers arranged to receive the taps 64 of the digital delay line 60; the second bank 70 comprises 4 four-input multiplexers arranged to receive the outputs of the multiplexer bank 68; and the third bank 72 comprises a single 4-input multiplexer configured to receive the outputs of the second multiplexer bank 70.

Each of the individual four-input multiplexers of the first, second, and third banks 68, 70, and 72 has a pair of control inputs A, B, which receive the control signals CTLB carried by corresponding pairs of the six signal lines from the up/down counter 28, via the multiplexer 40 (FIG. 2). The multiplexer circuit 66, under control of control signals CTLB, produced by the up/down counter 28, operates to select one of the phase-related versions of SYSCLKA as SYSCLKB. In this manner, the control state machine 22 has the capability of selecting one of the phase-delayed versions of SYSCLKA as, ultimately, SYSCLKOUT.

Turning now to FIG. 4, a schematic diagram of the time window circuit 36 of FIG. 2 is illustrated. The time window circuit 50 is of substantially identical design as that of time window 36. Therefore, the following discussion of time window 36 should be understood as applying equally to the time window circuit 50.

As FIG. 4 illustrates, the time window circuit 36 includes a latch 80 that receives, at its data (D) input the output (O) of the multiplexer 32. In the case of the time window circuit 50, of coarse, the corresponding latch 80 would receive, at its D input, the signal produced by the programmable delay circuit 38, i.e., the output of the multiplexer forming the third bank 72 of multiplexers (FIG. 3).

The enable (ENB) input of the latch 80 receives the output of a two-input AND gate 88. One input of the AND gate receives the SYSCLKB signal. The remaining input of the AND gate 88 receives a version of the SYSCLKB signal—delayed approximately 5 ns (in the case of the time-window circuit 36) by a delay circuit 90. The amount of delay provided by the delay circuit 90 depends upon the worse-case time it will take for the multiplexer 32 to settle down after changing selection. Thus, in the case of the multiplexer 66 and the time programmable delay circuit 38 (FIG. 3), the delay circuit 90 will be structured to exhibit a delay of approximately 9 ns, due to the additional loads imposed by the multiplexer banks 68, 70, and 72.

The time window circuit 36 operates to disable communication of the SYSCLKA signal from the multiplexer 32 to the programmable delay circuit 38. This delay filters out any digital slivers or glitches that may occur when the multiplexer 32 is commanded to switch selection from one of the received signals $f_1$–$f_7$ to another. It is the LOW to HIGH transition of SYSCLKB that causes state changes of the state machine 22, in turn causing any selection changes of the multiplexer 32. Accordingly, for a brief period of time, beginning with the LOW to HIGH transition of SYSCLKB, and ending with the period established by the delay circuit 90, the signal applied to the ENB input of latch 80 will be a HIGH. During this period, the state of the output of the multiplexer 32 as it existing at the LOW to HIGH transition of SYSCLKB is latched, and any signal changes at the D input of the latch 80 do not effect the Q output of that latch.

At the end of the delay period, the delayed version will go LOW. The output of the AND gate 88 will also go LOW, enabling the latch 80. While so enabled, the Q output of the latch 80 will follow the D input, and in this manner the delayed version of 2×CLK selected by the multiplexer 32 is communicated to the programmable delay circuit 38. Spikes or glitches that may be imparted to the signal by the multiplexer 32 via selection changes of the multiplexer are inhibited from being communicated to the programmable delay circuit 38—and ultimately onto the control and controlled logic 18 (FIG. 1). Those skilled in this art will readily realize that such spikes and/or glitches can cause serious repercussions were they not inhibited.

Referring now to FIG. 5, a schematic diagram of the phase-detect logic 24 (FIG. 2) is illustrated in greater detail, showing if as being constructed from two ranks of flip-flop pairs. The first rank consists of flip-flops 100, 102, whose respective outputs (Q) are coupled to the data (D) inputs of the second rank of flip-flops 104, 106.

Flip-flops 100, 102 operate to sample and compare the phase of the SYSOUT' and SYSCLK' signals; the second rank of flip-flops 104, 106 operate to store an indication of the outcome of the compare performed by the flop-flops 100, 102. As shown in FIG. 5, the SYSOUT' signal (generated by the processor 12; see FIGS. 1 and 2) is received at the data (D) inputs of the flip-flops 100, 102. The flip-flop 102 receives at its clock (CK) input the SYSCLK' signal generated by the clock synchronization system 20 (see FIG. 2), while the flip-flop 100 receives a delayed version of the SYSCLK' signal via delay circuit 108.

The flip-flops 100, 102 operate to determine whether SYSCLK' leads, lags, or is within a predetermined range of SYSOUT'. Referring to the timing diagram of the phase-detect logic 24, shown in FIG. 6, represented are three separate phase relationships between SYSOUT' and SYSCLK', denoted by the Roman numerals I, II and III on the SYSOUT' waveform A3. The SYSCLK' waveform A1 illustrates the situation of SYSCLK' leading SYSOUT' by more than acceptable amount, denoted by the case III on waveform A3. This phase relationship between SYSCLK' and SYSOUT' will cause the flip-flops 100 and 102 (and ultimately flip-flops 104, 106) will be set to states (ZERO, ZERO, respectively) to indicate this relationship. The waveform A2, on the other hand, illustrates the case of the SYSCLK' signal lagging the SYSOUT' signal. In this case, the flip-flops 100 and 102 (and ultimately, flip-flops 104, 106) will be set to states ONE, ONE, indicating the condition I on waveform A3.

If, however, the case II is found (i.e., the LOW to HIGH transitions of SYSCLK' and SYSOUT' are within the period established by the delay circuit 108), the two signals are within the desired range of one another and, therefore, are "synchronized." This phase relationship will cause the flip-flops 100/102 and 104/106 to be respectively set to ONE/ZERO states.

The result of the comparison made by the phase-detect logic 24 is reported, via the signal lines 25, to the control state machine 22. As will be seen below, if the compared signals are not within the preferred, synchronized range, the control state machine will receive the report of the phase-detect logic 24 and act accordingly by selecting one or another of the available signals produced by either the tapped delay line circuit 34 or the ones produced by the digital delay line 60 in an effort to find one that matches SYSOUT'.

Operation of the clock synchronization system to lock on and track the SYSOUT clock signal, produced by the processor unit 12 (FIG. 1), is illustrated in FIG. 7. First, however, note, as FIG. 2 illustrates, that the control state machine 22 receives two externally-generated signals. During initial power on, a power on (PON) signal is asserted only after it is assured that all power transitions have settled down and system power is fully on. Thus, after a predetermined period of time the PON signal is asserted. Before assertion of the PON signal, however, the control state machine 22 is in an initialization state, during which the clock synchronization system 20 is free-running; that is, while the PON signal is de-asserted, no attempt is made to synchronize the SYSCLKOUT signal to the SYSOUT signal.

When the PON signal is asserted, however, there still requires to be asserted the search enable (SEARCH) signal.

Thus, referring to FIGS. 2 and 7, when the PON or SEARCH signals, or either of them, are de-asserted, the clock synchronization system 20 is in a loop state 110: a free-running condition. The clock synchronization system 20 will continue to loop in the state 110 until the PON and SEARCH signals are both asserted. When this occurs, the control state machine 22 moves from the state 110 to a state 112 to preset the up/down counters 26, 28. Preferably, the up/down counters 26 are set to ZERO, while the up/down counters 28 are set to 15 (decimal).

So set, the up/down counters 26, 28 cause the multiplexer 32 to select clock signal $f_1$, the non-phase-delayed version of 2×CLK, from the tapped delay line circuit 34 as SYSCLKA. SYSCLKA is applied to the programmable delay circuit 38, which is programmed by the up/down counter 28 to delay the SYSCLKA by as much as 6 ns (15×0.4 ns), resulting in the SYSCLKB, which is divided by 2 by the divide-by-2 circuit 52, ultimately becoming SYSCLK' which is compared to SYSOUT'.

In the state 114, the control state machine 22 checks initially to determine if SYSOUT' leads SYSCLK'. This check is made by determining whether the signalling from the phase-detect logic 24 indicates that the flip-flops 104/106 are in respective states ZERO/ONE. If so, it is assumed that the two signals are 180° out of phase, and the control state machine moves to state 116, in which a control signal (INHIBIT) is issued by the control state machine 22 to inhibit the divide-by-2 circuit 52 for one 2×CLK clock period (state 116). This will cause the divide-by-two circuit 52 to shift the SYSCLKB signal by one period of the 2×CLK, resulting in effect in a phase shift of the SYSCLKB (and SYSCLK') signal.

Alternatively, the state of the flip-flops 104/106 may be ZERO/ZERO, indicating that SYSCLK' leads SYSOUT'. This initial phase relationship (SYSCLK' leading SYSOUT') assumes that the two signals are somewhere near synchronization (i.e., the rising edges of the signals SYSCLK' and SYSOUT' are within 180° of one another). In this case, the control state machine move directly from state 114 to state 116 without resort to state 116.

Once the two signals SYSCLK' and SYSOUT' are considered to be generally in phase, the control state machine 22 moves to the coarse adjust sequence formed by the states 118, 120, and 122, entering first the state 118. Here, the up/down counter 26 is incremented by one to select the next tap in order, i.e., selection of the clock signal $f_2$ from the tapped delay line circuit 34. The control state machine 22 then moves to state 120 to check the signaling from the phase-detect logic 24. If that signaling indicates that SYSCLK' leads SYSOUT', the control state machine 22 returns to state 118, incrementing the up/down counter 26 and selecting the next tap in order of the tapped delay line circuit 34. This sequencing through the states 118, 120 by the control state machine 22 will continue until, in state 120, it is determined that SYSCLK' no longer leads, but rather lags, SYSOUT'. When this is determined, the control state machine 22 moves to the state 122, where the up/down counter 26 is decremented by one, moving back one tap of the tapped delay line circuit 34.

The control state machine 22 then moves from state 122 into a grouping of states 124–134 which define a fine adjust sequence, during which control over the programmable delay circuit 38 is effected to select, as a synchronized replica of the SYSOUT, the SYSCLK-OUT. It is in this sequence that a search is made for the case II phase relationship between SYSCLK' and SYSOUT', referred to above.

Thus, in state 124, the control state machine 22 determines, from the signaling produced by the phase-detect logic 24, whether SYSCLK' leads or lags SYSOUT' (case I or III, respectively, FIG. 6), or are within a predetermined range of one another (case II, FIG. 6). Assume it is not the latter. since state 124 has just been entered from state 122, it is known that SYSCLK' leads SYSOUT'. Accordingly, the control state machine 22 moves to state 126, in which the up/down counter 28 is incremented by one. This, in turn, will cause the multiplexer section 66 (FIG. 3) of the programmable delay circuit 38 to move to the next adjacent one of the taps 64, selecting a version of the SYSCLKA signal that is delayed an additional 0.4 ns from the immediately preceding selection. The state machine 22 then moves to the state 128 in which a check is made to determine if the up/down counter 28 issued an overflow signal. The overflow signal will indicate that the up/down counter has traversed through all of the 64 taps without finding a case II (FIG. 6) synchronized situation and, therefore, that an error situation has occurred. Accordingly, if an overflow is detected, the control state machine 22 will exit the fine adjust sequence, which will be discussed more fully below.

However, if an overflow signal was not detected in state 128, the control state machine 22 returns to state 124 to again check the signaling from the phase-detect logic 24. If the phase-detect logic 24 again indicates that the SYSCLK' leads SYSOUT', the control state machine 22 will again move through the states 126, 128, returning to the state 124, (unless an overflow situation is detected), until the signaling from the phase-detect logic 24 indicates that SYSCLK' lags SYSOUT', or the two signals are within the acceptable range of one another.

Assume the former; the control state machine 22 will then move into state 130, in which the up/down counter 28 is decremented by one, causing the multiplexer section 66 of the programmable delay circuit 38 to select as SYSCLKB a delayed version of SYSCLKA that is 0.4 ns ahead of the immediately previously selected signal Moving to state 132, the control state machine 22 checks to determine whether or not the up/down counter 28 issued an underflow signal which, like the overflow signal that may be detected in state 128, indicates an error condition, and the fine adjust sequence is exited by the control state machine 22. If no underflow is detected, the control state machine 22 will return to state 124.

Unless overflow or underflow conditions are detected in states 128, 132, respectively, the SYSCLK' and SYSOUT' signals will be brought into a synchronized range (case II, FIG. 6), at which time the control state machine 22 will move to state 134, and assert the LOCK signal, indicating that the SYSCLKAOUT signal is generated by the clock synchronization circuit 20 is synchronized to SYSOUT.

State 134 is maintained by the control state machine 22 for a period of time, after which the control state machine 22 will force itself to return to state 124 to check the synchronization. If it is then determined that case II is no longer valid, one of the paths 126/128 or 130/132 will be entered to bring SYSCLKAOUT into synchronization with SYSOUT. Thus, the clock synchronization circuit 20 is capable of producing a synchronized clock representation of SYSOUT that tracks any minor variations of SYSOUT that may occur over temperature, voltage fluctuations, etc.

In summary there has been disclosed a clock synchronization system operable to produce a selected one of a plurality of phase-delayed versions of a clock signal synchronized to a reference signal for distribution as a system clock in a digital system. Although a preferred embodiment of the invention has been disclosed, there are modifications and variations that will occur to those skilled in this art upon reading the foregoing disclosure. For example, the control and controlled logic may be implemented in at least two different types of circuit technology (e.g., TTL and CMOS). This may require that different versions of the SYSCLKOUT to be produced in order to meet the needs of the technology used. Thus, certain versions of the SYSCLKOUT signal may lead or lag other versions of SYSCLKOUT signal, depending upon what technology is using the signal. This delay can be introduced at the output of the clock synchronization system 20 by either some form of fixed delays or programmable delays. It should be realized that such modifications will not depart from the true scope and spirit of the invention.

What is claimed is:

1. A clock synchronization system for providing a system clock signal synchronized to a reference clock signal, the system comprising:
   input means for receiving a first clock signal;
   first circuit means coupled to the input means to receive the first clock for developing therefrom a plurality of phase-related second clock signals, each of the second clock signals having a frequency substantially identical to that of the first clock signal;
   first multiplexer means coupled to receive the plurality of second clock signals for selecting a one of the second clock signals in response to control signals;
   second circuit means coupled to receive the selected one of the second clock signals for developing therefrom a plurality of phase-related third clock signals, each of the third clock signals having a frequency substantially identical to that of the first clock signal;
   second multiplexer means coupled to receive the plurality of third clock signals for selecting a one of the third clock signals in response to said control signals, the selected one the third clock signals forming the system clock signal;
   third circuit means operably coupled to receive and compare the selected one of the third clock signals and the reference clock signal to generate therefrom a phase signal indicative of whether the reference signal leads the selected one of the third signals; and
   control means coupled to the third circuit means and responsive to the phase signal to generate the control signals for effecting selection of the selected ones of the second and third signals.

2. The clock synchronization system of claim 1, wherein the control means includes state machine means responsive to the phase signal, and counter means controllable by the state machine means to count up or down to produce the control signals.

3. The clock synchronization system of claim 1, wherein the first circuit means comprises a plurality of series connected, non-inverting differential buffer circuit means, each of the differential buffer means having an output for producing a corresponding one of the plurality of the second clock signals.

4. The clock synchronization system of claim 2, the counter means including a bi-directional counter for providing the control signals.

5. The clock synchronization system of claim 1, including time windowing means coupled to the multiplexer means to receive the selected one of the plurality of second clock signals for inhibiting communication of the selected one of the plurality of second clock signals for a predetermined period of time beginning with any change of selection by the first multiplexer means.

6. A clock synchronization system for providing a system clock signal synchronized to a reference clock signal, the system comprising:
   means for generating a first clock signal;
   means responsive to the first clock signal to generate therefrom a plurality of clock signals each being of a frequency substantially equal to that of the first clock signal, and each being phase delayed corresponding integral amounts from the first clock signal;
   multiplexer means coupled to receive and select a one of the plurality of clock signals as the system clock signal in response to control signals;
   means for receiving and comparing the selected one of the plurality of clock signals and the reference clock signal to generate therefrom a phase signal indicative of the phase relationship between the reference signal and the selected one of the plurality of clock signals; and
   state machine means responsive to the phase signal, and counter means controllable by the state machine means to count up or to count down to produce the control signals.

7. The clock synchronization system of claim 6, including means for shifting the phase of the selected one of the plurality of clock signals in response to a predetermined phase signal indication.

8. The clock synchronization system of claim 6, wherein the means for generating the plurality of clock signals comprises a plurality of series connected, non-inverting differential buffer circuit means, each of the differential buffer means having an output for producing a corresponding one of the plurality of signals.

9. The clock synchronization system of claim 6, the counter means including bi-directional counter means for counting up and counting down.

10. A clock synchronization system for providing a system clock signal synchronized to a reference clock signal, the system comprising:
    means for generating a first clock signal;
    means responsive to the first clock signal to generate therefrom a plurality of clock signals each being of a frequency substantially equal to that of the first clock signal, and each being phase delayed corresponding integral amounts from the first clock signal;
    multiplexer means coupled to receive and select a one of the plurality of clock signals in response to first control signals;
    first circuit means for shifting the phase of the selected one of the plurality of clock signals in response to second control signals, the first circuit means providing therefrom the system clock signal;
    second circuit means coupled to receive and compare the system clock signal provided by the first circuit means with the reference clock signal to generate therefrom a phase signal indicative of the phase relationship between the reference signal and the selected one of the plurality of clock signals; and
    control means responsive to the phase signal to generate the first and second control signals.

11. The system of claim 10, the control means including bi-directional counting means operable to produce the first and second control signals.

12. The system of claim 11, the control means including state machine means coupled to receive and respond to the phase signal to control the bi-directional counting means to produce the first and second control signals.

13. The system of claim 12, wherein the bi-directional counting means is operable to count up or down in response to control from the state machine means.

* * * * *